Jan. 8, 1974     A. R. KAUFMANN     3,784,656
METHOD OF PRODUCING SPHERICAL POWDER BY ECCENTRIC
ELECTRODE ROTATION
Filed Dec. 3, 1971
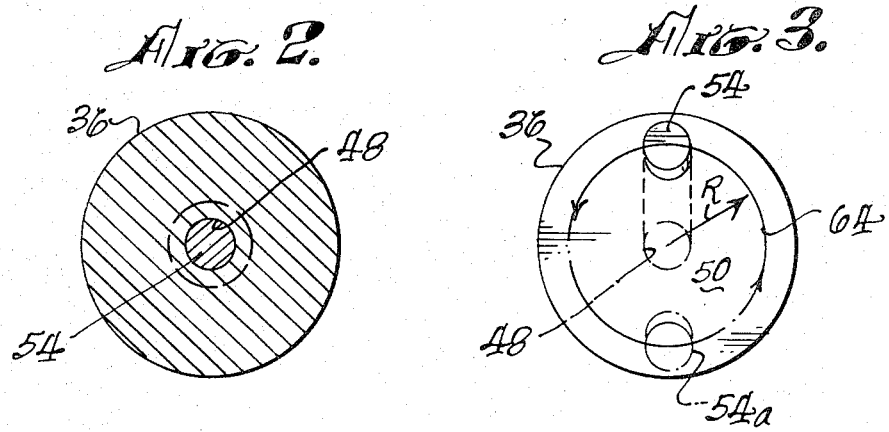
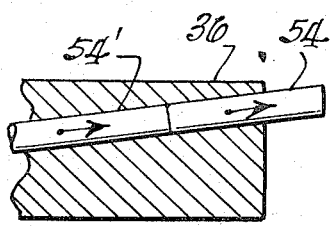
INVENTOR.
ALBERT R. KAUFMANN,
Donald E. Nost
By Jay H. Just
ATTORNEYS United States Patent Office 3,784,656
Patented Jan. 8, 1974

3,784,656
METHOD OF PRODUCING SPHERICAL POWDER BY ECCENTRIC ELECTRODE ROTATION
Albert R. Kaufmann, Lexington, Mass., assignor to Whittaker Corporation
Filed Dec. 3, 1971, Ser. No. 204,493
Int. Cl. B01j 2/02
U.S. Cl. 264—8          14 Claims

ABSTRACT OF THE DISCLOSURE

A method for producing generally spherical particles from materials, e.g., metals, initially in rod form. The preferred method comprises feeding a consumable rod from which the particles are to be formed into a heating zone while orbiting the leading end of the rod about its longitudinal axis and, simultaneously, rotating the rod about the same axis. The leading end of the rod is heated to cause melting of the rod material. Due to the spinning of the rod and the melted form of the rod material, liquid droplets are formed around, and spun off from, the periphery of the heated end of the rod. The droplets are allowed to cool below their melting temperature before contacting any surfaces to preserve their shape and are thereafter collected as solid, generally-spherical particles.

The method is preferably carried out in apparatus comprising a chamber with wall openings to receive one end of a rotatable shaft and a conventional electrode in opposing relationship. The shaft has a bore extending therethrough which is angled with respect to the longitudinal axis of the shaft and which is sized to slidably receive a consumable rod which, in turn, forms a consumable electrode. Power sources are provided (a) to rotate the shaft about its own axis to produce orbiting of the consumable electrode, (b) to rotate the latter about its own axis, and (c) to feed the consumable electrode through the shaft and into the chamber. An electrical energy source sufficient to establish an arc between the electrodes within the chamber to heat and melt the consumable electrode is provided. The chamber may be evacuated and then filled with an inert gas to provide a non-oxidizing atmosphere and is provided with seals necessary for this purpose.

BACKGROUND OF THE INVENTION

The invention relates to powder making and, more particularly, to a method for making generally spherical metallic shot or particles in production quantities.

Metallic powders find frequent application throughout the metal working industry in, for example, magnetic equipment, alloys, nuclear fuel elements and shielding material for nuclear reactors. Many metallic components can be more readily and economically formed from metallic powders than by conventional metal working processes. For example, powder of the desired material or materials can be compacted in a shaped die and sintered to produce parts of desired engineering characteristics. Additionally, powders suitably encased can be extruded to provide elongated components of desired cross-sectional shape.

To achieve the desired characteristics, these applications often require the use of very pure, spherical powders of very small dimension on the order of 50–500 microns in diameter and less. That is, the finer the size, the more uniform the character of the powder and the more satisfactory is the blend which may be achieved with other powders. In addition to applications requiring powders of the aforementioned size range, other applications exist for substantially larger particles such as shotgun shot.

Heretofore, many different techniques have been utilized to produce metallic powders. The simplest method involves the use of mechanical cutters or grinders to comminute solid stock. Although this technique has the advantage of being able to produce powder in relatively large quantities, such powders are generally in chip or flake form rather than spherical form and their purity is generally in question due to contact between the cutting or grinding surfaces and the stock being comminuted.

Another technique involves the preparation of metallic powders by chemical reduction of salts of the metal to be powdered. The particles to be produced by such processes generally do not have the desired sphericity and such processes are relatively expensive.

An especially useful technique for making powder is described in U.S. Pat. No. 3,099,041, issued July 30, 1963 to the instant inventor and assigned to the assignee of the present invention (hereafter "said patent"). Briefly, the process described therein produces generally spherical powders of high purity by rapidly rotating a rod of the material from which the powder is to be formed about its own longitudinal axis and opposite a conventional electrode through which current is supplied to create an arc between the rod and conventional electrode to melt portions of the former. Because of the spinning of the rod, droplets are formed at its periphery which are cast off by centrifugal force and cooled to form the desired generally spherical powder. The heating may be conducted inside a chamber to provide a non-oxidizing atmosphere to prevent oxidation of the metal. The length of consumable rods is limited because the unsupported tip of the rod adjacent to the conventional electrode "whips" due to the rotation of the rod. This whipping tends to deflect the rod outwardly of its longitudinal axis thereby imposing severe stresses upon the rotating mechanisms and associated parts and interfering with the required arcing between it and the conventional electrode. Therefore, this process has been limited to use with rods of rather short length in relation to their thickness, for example, to the use of rods on the order of 10 inches in length and 2.5 inches in diameter in the case of steel rods. Although metallic powders of the desired size, configuration, and purity can be formed by this process, the rate of powder formation is limited by the frequent need to replace the consumable rods.

An improvement over the process described in said patent is described in a pending patent application, Ser. No. 55,901, filed July 17, 1970 (now abandoned) by the instant inventor and assigned to the assignee of this invention (hereafter "said patent application"). The process described in said patent application is generally similar to the method described in said patent except that means are provided to rapidly load the consumable rods external to the chamber and to substantially reduce the tendency of the unsupported end of the consumable rod to whip. Unique sealing means are also provided to seal the hole in the chamber wall through which the consumable rod extends and to aid in reducing the whipping of the unsupported end of the rod.

The process described in said patent application produces particles of substantially the same size, shape and purity as produced in said patent and, furthermore, enables such particles to be produced at a faster rate than is possible using the process that is described in said patent. This faster production rate is due both to the external loading and to the use of longer rods, for example, on the order of 48 inches in length and 2.5 inches in diameter for a steel rod. In spite of these improvements, the process described in said pending patent application still uses relatively short, large diameter rods which prevents the realization of production rates which could be obtained if smaller diameter rods which are available in substantially longer lengths could be employed. Additionally, large diameter stock is more expensive than small diameter rod because the latter is produced in long lengths whereas the former must be cut to length. Furthermore, unmelted stubs represent a fairly large loss when using relatively short rods.

SUMMARY OF THE INVENTION

Briefly, the method comprises melting one end of a consumable rod from which the spherical particles are to be formed while simultaneously orbiting and rotating the heated end of the consumable rod about its longitudinal axis. Preferably, heating is accomplished by establishing an arc between a conventional electrode and the heated end of the consumable rod by passing a current therethrough. The arc is maintained by feeding the consumable rod at a predetermined rate toward the conventional electrode. A chamber is also preferably provided within which heating takes place so that the heating can be performed in a non-oxidizing atmosphere. To orbit the heated end of the consumable rod, a shaft is employed which extends into the chamber and which is provided with a bore extending therethrough which is angled with respect to the longitudinal axis of the shaft and which is sized to slidably receive the consumable rod. Rotation of the shaft produces orbiting of the consumable rod due to the eccentric positioning of the latter with respect to the longitudinal axis of the shaft. In other respects, the apparatus employed herein is generally similar to that described in said patent application.

Due to the combination of orbiting and spinning of the heated end of the consumable rod, whipping of the latter is substantially eliminated. This permits the use of rods up to 200 feet in length and longer and having a diameter as small as one-quarter inch and less. Powder can be produced at less cost by the herein described process than by the processes described in said patent and said patent application because longer, smaller diameter rods can be employed herein. A cost saving is thus effected by the use of less expensive rod and by the longer continuous running time due to the use of longer rod. A further cost savings is realized because the unmelted stubs represent a substantially smaller loss in relation to the longer rod employed herein as compared to the shorter rod employed in said patent and patent application.

DESCRIPTION OF THE DRAWINGS

FIG. 1 is a side cross-sectional view of the apparatus employed herein.

FIG. 2 is a cross-sectional view of the rotating shaft taken along the line 2—2 in FIG. 1.

FIG. 3 is an end view of the same shaft taken along the line 3—3 in FIG. 1 showing displacement of the heated end of a consumable rod from the longitudinal axis of the shaft.

FIG. 4 is an expanded sectional view of a portion of the rotatable shaft showing a new consumable rod pushing the stub of a consumed rod through the bore within the shaft.

DESCRIPTION OF THE PREFERRED EMBODIMENT

In general, the method of this invention comprises heating one end of a consumable rod while simultaneously orbiting and rotating that end about the longitudinal axis of the rod. This heating produces melting of the rod material so that liquid droplets are formed at the periphery of the heated end of the rod and spun off by centrifugal force. Provision is made to cool the liquid droplets before they can contact any surfaces to thereby preserve their spherical shape. Preferably, heating is accomplished by establishing an arc between a conventional electrode and the orbiting, rotating end of the consumable rod. It is also preferred to carry out the heating in an inert atmosphere to prevent oxidation of the liquid droplets.

The method of this invention, together with apparatus for its implementation, will now be more particularly described with reference to the drawings. As shown in FIG. 1, the numeral 10 designates the presently preferred embodiment of this invention. This embodiment 10 includes a chamber 12 which is generally cylindrical in shape and which includes front and rear walls 14, 16, respectively, and side wall 18. Opposing, non-aligned openings, 20, 22, are located in the front and rear walls 14, 16, respectively. The opening 20 receives an electrically-conductive shaft 24 of an essentially non-consumable conventional electrode 26 which terminates in a plate 28 within the chamber 12. A heavy electrical lead 30 is connected to the shaft 24 of the conventional generally non-consumable electrode 26 through a conductive clamp 32. The electrical lead 30 is attached to the positive terminal of a high current power supply (not shown). A seal 34 is provided to seal the annular area of the opening 20 in the front wall 14 surrounding the conventional electrode shaft 24, but still permit axial movement of the electrode plate 28 for adjusting the position of the plate within the chamber 12.

A rotatable shaft 36 extends through a seal 38 into the interior of the chamber 12 and is supported at its end adjacent the chamber 12 by a dynamic or steady rest 40. The other end of the shaft 36 is engaged around its periphery by cylindrical jaws 42 which are fixedly received within an axially aligned bore 44 of a suitably-supported spindle 46. Means, for example, a set screw (not shown) extending through the jaws 42 to contact the periphery of the rotatable shaft 36 are employed to demountably affix the rotatable shaft to the cylindrical jaws. As so arranged, the spindle 46 and the rotatable shaft 36 are coaxially aligned. Additionally, power means (not shown) are provided to rotate the spindle 46 and thereby rotate the shaft 36.

Because of the high rotational speeds of the rotatable shaft 36, the seal 38 surrounding the shaft in the rear wall 16 of the chamber 12 is preferably specially constructed to withstand such high rotational speeds and to provide an effective support at the rear wall of the chamber for the shaft. Such a seal is thoroughly described in said patent application, p. 13, line 15 to p. 15, line 14 and is incorporated herein by reference. Again because of the high rotational speeds of the rotatable shaft 36, it is necessary to restrain the end of the shaft extending into the chamber 12 to prevent it from whipping while permitting it to rotate about its own axis. The dynamic rest 40 accomplishes this purpose. A preferred embodiment of the dynamic rest 40 is fully described in said co-pending patent application at p. 15, line 5 to p. 16, line 19 and is incorporated herein by reference.

The rotatable shaft 36 is provided with a bore 48 extending through the shaft and exiting at the forward and rear faces 50, 52 respectively of the shaft. The bore 48 is sized to slidably receive a consumable rod or electrode 54 which is fed by feed rolls 56 axially through the spindle 46, the rear face 52 of the shaft 36, the shaft bore 48 emerge through the front face 50 of the shaft in the chamber 12 opposite the conventional electrode plate 28. The bore 48 has essentially three sections. These include a rearwardly-extending, axially-aligned section 58 and a forwardly-extending straight section 62 which is angled with respect to the longitudinal axis of the rotatable shaft 36, and a curved intermediate section 60 joining the rearwardly and forwardly-extending sections. The rearwardly-extending section 58 of the shaft bore 48 is axially aligned to facilitate entrance of the consumable rod 54 into the rotatable shaft. The intermediate section 60 of the bore 48 is gently curved to facilitate transition of the consumable rod 54 from the straight, rearwardly-extending bore section 58 to the straight, forwardly-extending bore section 62. The forwardly-extending bore section 62 is angled with respect to the longitudinal axis of the rotatable shaft 36 so that rotation of the shaft about its longitudinal axis causes orbiting of the unsupported end of the consumable rod 54 (FIG. 3).

As is shown in FIG. 3, the unsupported end of the consumable rod is initially in an upper position (shown in solid outline) a spaced distance R above the longitudinal axis of the shaft. Rotation of the rotatable shaft 36 about its longitudinal axis causes the free end of the consumable rod to described a circle or orbit 64 so that after the shaft has turned through 180°, the free end of the consumable rod has reached the lower position 54a shown in phantom line in FIG. 3 which is also a spaced distance R from the longitudinal axis of the rotatable shaft. Continued rotation of the shaft 36 causes the free end of the consumable electrode to complete the circle or orbit 64. Thus, it will be understood that rotation of the rotatable shaft 36 about its own axis produces an eccentric or orbital movement of the unsupported end of the consumable rod.

In addition to the orbital movement provided to the unsupported end of the consumable rod 54, the latter is provided with a rotational movement about its own longitudinal axis by skewed feed rolls 56 which also provide the consumable rod with translational movement to feed it toward the chamber 12. The rotational movement provided the consumable rod 54 by the feed rolls 56 does not have to exactly equal the rotational movement of the spindle-rotatable shaft combination since an O-ring 57, which encircles the consumable electrode 54 in a groove (not shown) in the inner wall of the rotatable shaft 36 permits some slippage between the consumable rod and the rotatable shaft 36.

To complete the electrical circuit and thereby establish an arc between confronting surfaces of the conventional electrode 26 and the consumable electrode 54, an electrical lead 66 connects a high current power supply (not shown) to the consumable electrode 54 through brushes 68.

In operation, a consumable electrode is fed through the feed rolls 56, the brushes 68 and axially through the spindle 46 into the axially-aligned, rearwardly-extending bore section 58 from which it feeds through the remaining portion of the bore 48 into the chamber 12. The electrical circuitry is completed and an arc is established between the conventional and consumable electrodes 26, 54, respectively. This arc is maintained by feeding the consumable electrode 54 toward the conventional electrode 26 at a predetermined rate. Spindle 46 and thus the rotatable shaft 36 are caused to rotate about their longitudinal axis which produces the aforedescribed orbital movement of the unsupported end of the consumable electrode 54. Maintenance of the arc is normally facilitated by the use of a conventional electrode plate 28 of a diameter substantially equal to the diameter of the orbit 64 of the consumable electrode 54.

As heating of the unsupported end of the consumable electrode 54 continues, the material forming the consumable electrode melts and liquid droplets are formed at the periphery of the heated end of the consumable electrode and are spun off by the centrifugal force from both the rotational and orbital movement of the latter. Sufficient space is provided in the chamber 12 to permit cooling of the liquid droplets which have spun off the consumable electrode 54 to a temperature below their melting point to preserve their spherical shape. The cooled particles are then collected and withdrawn from the chamber 12 through a suitable port (not shown) provided in the bottom of the chamber.

In applications where it is undesirable to form the spherical particles in the presence of oxygen, the chamber 12 may be evacuated and then filled with a gas which is inert to the material comprising the consumable electrode. If this is done, it is preferably done prior to establishing an arc between the conventional and consumable electrodes 26, 36, respectively.

As a particular consumable electrode 54 is consumed, it is preferably replaced immediately by another consumable electrode to provide substantially continuous operation. This is preferably accomplished by feeding a second consumable electrode 54' (FIG. 4) directly behind and in abutting contact with a first consumable electrode 54 so that after the first consumable electrode has completely passed the feed rolls 56, the motive force for the first consumable electrode is provided by the second consumable electrode which, in turn, is provided with translational movement by the feed rolls. Rotational movement of the consumable electrode 54, after it has completely passed the feed rolls 56, is provided both by the rotation of the rotatable shaft 36 transmitted to the consumable electrode 54 through the O-ring 57 and by the following consumable electrode 54'. As each consumable electrode becomes substantially consumed, the residual portion or butt 70 drops out of the rotatable shaft bore 48 to the bottom of the chamber 12. These butts 70 may be removed at the same time and through the same port used to remove the powdered product.

In general, the diameter of the consumable electrodes will vary between about 1/8 inch and about 1 inch, although both larger and smaller diameters may be employed, and will vary in length from about 2 feet to about 200 feet, although shorter and longer lengths may be employed.

The consumable electrodes 54 are advanced towards the conventional electrode 26 at a rate sufficient to maintain the arc therebetween. This feed rate will depend on the magnitude of the arc current and on the diameter of the consumable electrode. The rotational velocity of the consumable electrodes and the orbital velocity of the consumable electrodes provided by the rotational velocity of the rotating shaft 36 will vary depending upon the particular material forming the consumable eelctrodes. The orbital velocity will also depend upon the radial distance of the unsupported end of the consumable rod 54 from the longitudinal axis of the rotatable shaft 36. The upper limits are set by the stress absorption capabilities of the various components employed herein. In general, the consumable electrodes will be rotated at velocities of from about 600 r.p.m. to about 20,000 r.p.m. Typical rotational velocities for the rotatable shaft 36 (orbital velocities of the consumable rod 54) fall within the range between about 600 r.p.m. and about 20,000 r.p.m. As described, the radical distance between the center of the unsupported end of the consumable electrode and the longitudinal axis of the rotatable shaft is pre-set with reference to the rotating velocity of the shaft 36 to provide the desired orbital velocity for the consumable electrode. Typically, the radical distance between the center of the bore 48 at the front face 50 of the rotatable shaft 36 to the longitudinal axis of the rotatable shaft will vary between about 1 inch and about 2 inches with the consumable electrode extending about 1 inch to about 2 inches beyond the front face 50.

The consumable electrodes employed herein may be formed from low or high melting point metals or like materials including, for example, aluminum, lead, magnesium, steel, zirconium, molybdenum, nickel, cobalt, copper, tantalum, columbium and beryllium. Alloys of these and other electrode materials may also be used. The conventional electrode may be made from, for example, tungsten.

A preferred embodiment has thus far been described. However, a number of modifications may be made within the scope of this invention. For example, heating of the consumable rod may be accomplished by use of a plasma arc torch, an open flame torch or a laser beam to provide the required melting of the consumable rod material. Additionally, the chamber 12 could be provided with a window through which energy rays would be directed to melt the rod material. Furthermore, production of the spherical particles need not be conducted within a chamber in applications where a particular atmosphere is not required.

In applications where heating is obtained without resorting to the use of electrodes, the consumable rod material need not be electrically conductive nor be capable of being made electrically conductive. In such cases, ceramic and refractory materials may be used alone to form the consumable rod.

I claim:

1. A method for producing generally spherical particles, comprising the steps of:
   introducing one end of a consumable rod into a heating zone, said consumable rod comprising a material from which said spherical particles are to be formed;
   orbiting said one end of said consumable rod in said heating zone about the longitudinal axis of said consumable rod;
   rotating said consumable rod about said longitudinal axis simultaneously with said orbiting;
   heating said one end of said consumable rod in said heating zone to cause melting of said material while simultaneously orbiting and rotating said consumable rod, whereby liquid droplets are formed along the periphery of said one end of said consumable rod and are centrifugally spun off therefrom and cooling said droplets to form generally spherical particles.

2. The method of claim 1 including the additional step of collecting said particles after they have cooled to a temperature below the melting point of said material.

3. The method of claim 2 including the steps of continuously feeding said rod into said heating zone and continuing to heat said one end of said consumable rod as said consumable rod decreases in length due to said melting and spinning-off of said particles.

4. The method of claim 1 wherein said consumable rod is electrically conductive to form a consumable electrode and wherein said method further includes:
   introducing a generally non-consumable electrode into said heating zone, and
   passing a current through said consumable and said non-consumable electrodes to produce an arc therebetween to heat said one end of said consumable electrode.

5. The method of claim 4 including the additional step of substantially continuously feeding said consumable electrode into said heating zone at a predetermined rate to maintain said arc.

6. The method of claim 1 wherein said heating zone is substantially filled with a gas inert to said consumable rod material.

7. The method of claim 1 wherein said material is a metal.

8. The method of claim 1 wherein said consumable rod is rotated at a velocity between about 600 r.p.m. and about 20,000 r.p.m. and is orbited at a velocity between about 600 r.p.m. and about 20,000 r.p.m.

9. A method for producing generally spherical metallic particles, comprising the steps of:
   introducing one end of a consumable electrode formed from a metallic material into a heating zone;
   introducing a generally non-consumable electrode into said heating zone;
   orbiting said one end of said consumable electrode within said heating zone about the longitudinal axis of said consumable electrode;
   rotating said consumable electrode about said longitudinal axis simultaneously with said orbiting;
   establishing an electric arc between said one end of said consumable electrode and said non-consumable electrode sufficient to heat said metallic material at said one end of said consumable electrode to a temperature at least equal to its melting temperature, whereby liquid droplets of said metallic material are formed and spun off from the periphery of said one end of said consumable electrode;
   continuously introducing said consumable electrode into said heating zone at a rate sufficient to maintain said arc;
   cooling said liquid droplets after they are spun off from said consumable electrode, and before said liquid droplets contact a surface, to a temperature below said melting point of said metallic material to produce solid, generally-spherical metallic particles; and
   collecting said metallic particles.

10. The method of claim 9 wherein said heating zone is substantially filled with a gas inert to said consumable electrode.

11. The method of claim 10 including feeding a plurality of said consumable electrodes sequentially and co-axially into said heating zone to provide a substantially continuous process.

12. The method of claim 9 wherein said consumable electrode is formed from the group consisting of steel, zirconium, molybdenum, nickel, cobalt, copper, tantalum, columbium, beryllium and electrically-conductive alloys of the foregoing.

13. The method of claim 9 wherein said consumable electrode is provided with a rotational velocity between about 600 r.p.m. and about 20,000 r.p.m.

14. The method of claim 13 wherein said consumable electrode is provided with an orbital velocity between about 600 r.p.m. and about 20,000 r.p.m.

References Cited

UNITED STATES PATENTS

| | | | |
|---|---|---|---|
| 3,099,041 | 7/1963 | Kaufmann | 264—8 |
| 2,189,387 | 2/1940 | Wissler | 264—10 |

ROBERT F. WHITE, Primary Examiner

J. R. HALL, Assistant Examiner

U.S. Cl. X.R.

264—10